UNITED STATES PATENT OFFICE 2,429,289

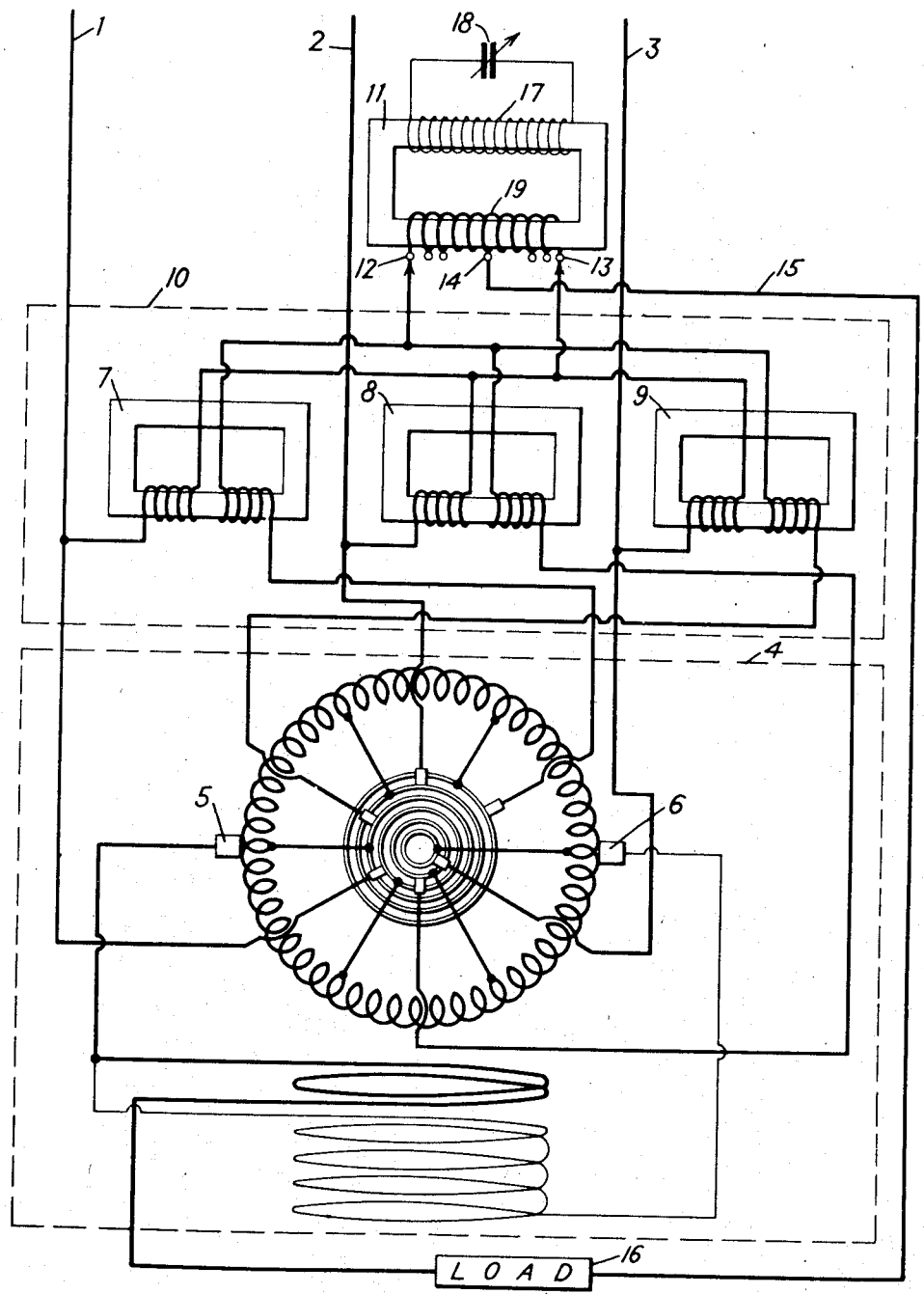

ARC-WELDING CONVERTER

Montford Morrison, Upper Montclair, N. J.

Application January 6, 1944, Serial No. 517,203

5 Claims. (Cl. 171—123)

The present invention relates to synchronous converters. It relates in particular to the operation of such converters through a neutral connection, and relates specifically to such machines when used in direct current arc-welding circuits.

Among the objects of the invention are; to provide, from an alternating current supply circuit, a source of direct current for arc welding having a higher apparatus efficiency than an equivalent motor-generator set; to provide a converter suitable for arc welding having a higher electrical efficiency than an equivalent motor-generator set; and to provide a converter device for such application having a basically lower manufacturing cost than an equivalent arc-welding motor-generator set.

In the prior art rotating dynamo electric machines for use in producing direct currents for arc welding application, motor-generator sets have been resorted to, the generator being a direct current machine with a differentially compounded field. The reason for the choice of such a set was to obtain a generator with drooping voltage characteristics combined with such current limiting characteristics as are conducive to the production of a stable arc for welding purposes.

These motor-generator sets have a very low overall apparatus efficiency because they require three machines to accomplish the results sought after. If the full load rating of the direct current generator is taken as having an apparatus efficiency of one, then the addition of the driving motor, which must be of approximately the same machine size, reduces this apparatus efficiency to 50%. The fact that the generator does not operate at full voltage but at a minor fraction of full voltage, reduces the machine efficiency to a minor fraction of 50% and the addition of the exciter still further reduces this value so that the overall apparatus efficiency is something of the magnitude of 20% of unity value, reckoned from the full voltage full load rating of the direct current generator. The electrical efficiency of such a three-machine set is, of course, the direct current machine efficiency multiplied by the alternating current machine efficiency, taking into account the losses in the exciter which brings the electrical efficiency down to a value lying within the range of between 50 and 60%.

Standard synchronous converter devices and circuits have not been applied to arc welding because synchronous converters require the direct current voltage across the brushes to be maintained substantially constant or at least substantially constant with reference to a given polar field strength, to maintain the required speed-voltage characteristics for synchronous operation.

Synchronous converters have a high apparatus efficiency, a three-ring machine having an apparatus efficiency of about 66% above the direct current machine rating and a six-ring converter having an apparatus efficiency of nearly double that of the direct current machine rating.

Where transformer devices are employed in connection with synchronous converters, the electrical efficiencies of the order of 97% are commonly attained. The present invention provides circuits, means and methods of employing the highly efficient qualities of synchronous converter devices for the generation of suitable direct currents for welding circuits. In the present invention the employment of the synchronous converter is made possible by an improvement which allows the armature voltage across the direct current brushes to remain substantially constant and at the same time provide drooping characteristics in the load circuits making them suitable to arc welding application.

I have discovered that by the employment of my improved circuits in conjunction with synchronous converters, I can draw extremely heavy loads from the machine for arc-welding purposes with drooping-voltage characteristics without disturbing substantially the synchronous-speed voltage of the machine.

These and other features will be pointed out and obvious in the reading of the description hereunder, particularly when taken in connection with the drawing which shows a diagrammatic representation of my invention.

The present invention provides, by method and means, operational characteristics for synchronous converters which permits the direct current voltage between the commutator brushes of the machine, to remain substantially constant while the voltage available in a neutral circuit may be modified to adapt the neutral circuit current to arc-welding purposes.

An important nature of the invention resides in providing in the alternating-current input circuit of a polyphase machine, a transformer device which has the several coils thereof grouped in a manner to produce a circuit which causes the direct current in a neutral connection to be responsive to an alternating current reactance connected to the alternating current side of the said synchronous converter.

There are many ways of incorporating the above defined spirit of the invention into practical devices, and the invention may be applied to any polyphase commercial frequency circuit. The grouping of the transformer coils and the arrangements of the circuits connected thereto are immaterial in so long as the neutral connection employed in the present invention, is caused to produce alternating current in the transformer device circuit.

In the case of a two-phase supply line, the current produced by the neutral in the said transformer circuits may be a second harmonic of the fundamental of the supply circuit. In the case of a three-phase supply circuit, the current produced by the neutral in the said transformer devices may be a third harmonic and so on. In a similar manner, various different harmonics as well as the fundamental, may be brought into use in an embodiment of this invention.

For the sake of simplicity in teaching the present invention as well as for clearness in the description connected therewith, a three-phase supply circuit will be used in electrical cooperation with a six-ring synchronous converter.

Referring to the drawing, 1, 2 and 3 represent the conductors of a three-phase supply circuit supplying by direct connection, the energy required for a three-phase synchronous converter enclosed within the dotted area 4.

The synchronous converter in dotted area 4 is represented as being a six-ring machine, compound wound. The supply leads, 1, 2 and 3 are directly connected in delta to three rings of the said synchronous converter providing direct driving power for the said synchronous converter without the interposition of any intermediate apparatus.

With such connections as above described, it will be appreciated that the synchronous converter may operate normally with full voltage between the direct current brushes 5 and 6, as is common practice in the art.

The other three slip rings of the synchronous converter 4, and which slip rings are not connected directly to the supply lines 1, 2 and 3, are connected to the armature of the converter 4, at taps representing a reversed delta connection, as referred to the taps of the slip rings to which line leads 1, 2 and 3 are connected.

The armature and slip rings above described are those of a conventional six-ring synchronous converter, as will be understood by those skilled in the art.

The six slip rings of the said converter are connected double-Y to a group of transformer devices, 7, 8 and 9, which are enclosed within the dotted area 10 and may be designated as primary input transformers. While in the drawing these said transformer devices, 7, 8 and 9, are illustrated as alternating current reactors, they may have additional windings which may be suitably connected to leads 1, 2 and 3, if and when desired, as will be understood by those skilled in polyphase transformer art.

Between the double-Y-connected transformer devices illustrated within the dotted area 10, is connected the interphase transformer 11 having variable taps 12 and 13 and an intermediate connection 14 to which the neutral lead 15 is connected, which with load 16, provides a direct current circuit to brush 5 of the converter 4.

Interphase transformer 11 may have a secondary coil 17 which may be loaded by a variable capacitance to 18. With closed coupling between windings 17 and 19 of interphase transformer 11, this device can be caused to produce either inductive reactance or capacitive reactance, in the primary circuit thereof, depending upon the adjustment of the capacitor 18. With the capacitor 18 at zero capacitance position, the interphase transformer 11 produces only inductive reactance which may be varied by means of taps 12 and 13. However, with the capacitance 18 set at its maximum value, the reactance of interphase transformer 11 may be made to be almost purely capacitive in effect, in the primary circuit thereof.

In the operation of a synchronous converter as described above, supply lines 1, 2 and 3, being directly connected to suitable rings of the converter 4, provide the required speed-voltage between brushes 5 and 6 which maintain the machine in synchronous operation.

However, the current which is drawn through the neutral lead 15 is caused to be converted into alternating current in the interphase transformer 11, which under preferred conditions, produces a third harmonic in the winding 19. Therefore, the direct current which circulates in the neutral lead 15 is subject to the alternating reactance of the coil 19 and to any current which may be in coil 17. Thus, the interphase transformer 11 serves as a means in the alternating current circuit to control the direct current in the neutral lead 15 and without substantially affecting the speed-voltage between brushes 5 and 6.

Thus, the present invention provides a synchronous converter having the high apparatus efficiency characteristics of such a machine together with the high electrical efficiency accompanying such a structure and which machine is provided with a drooping direct current characteristic in the neutral circuit, adapted to arc welding service.

Such a machine as described has the remarkable property of carrying loads as high as 200% in the neutral lead without affecting the speed voltage of the machine more than a few percent.

The armature of the synchronous converter 4 may be double-wound to distribute the armature turns such that the armature reactions under all poles are equal, if and when desired. This feature is not specifically shown in the drawing as it will be fully understood by those skilled in the art of armature structure from the instructions given supra.

The synchronous converter 4 is not limited to the type of machine diagrammatically illustrated, but may be any suitable type of converter with or without compounding, with or without commutating poles, and with or without any polar modification such as has been known as split-poles.

Such a machine, when supplied with a suitable damper winding, becomes self-starting and does not hunt out of step with heavy overloads in the neutral circuit.

Having described one embodiment of my invention, the scope thereof is set forth in the claims hereunder.

What I claim is:

1. In an alternating-current converter device, a polyphase synchronous converter having six alternating current terminals and having direct current terminals, two groups of Y-connected transformer windings, said alternating current terminals being connected to the terminals of said Y-connected transformer windings, means for connecting one set of transformer windings to a three phase source of alternating current, an interphase transformer having its primary connected between the neutral points of said groups, the secondary circuit for said interphase transformer including a condenser, a neutral connection to an intermediate tap on the primary of said interphase transformer, and a load connected between said connection and one of said direct current terminals.

2. In an alternating-current converter device, a polyphase synchronous converter having six alternating current terminals and having direct current terminals, two groups of Y-connected transformer windings, said alternating current terminals being connected to the terminals of said Y-connected transformer windings, means for connecting one set of transformer windings to a three phase source of alternating current, an interphase transformer having its primary connected between the neutral points of said groups, the secondary circuit for said interphase transformer including a condenser, a neutral connection to an intermediate tap on the primary of said interphase transformer, and a load connected between said connection and one of said direct current terminals, whereby the direct current load is responsive to the alternating current reactance of said interphase transformer.

3. In an alternating-current converter device, a polyphase synchronous converter having six alternating-current terminals and having direct-current terminals, two groups of Y-connected transformer windings, said alternating-current terminals being connected to the terminals of said Y-connected transformer windings, means for connecting one set of transformer windings to a three-phase source of alternating current, an interphase transformer having a winding connected between the neutral points of said groups, a neutral connection to an intermediate tap on the winding of said interphase transformer, and a load connected between said connection and one of said direct-current terminals.

4. In an alternating-current converter device, a polyphase synchronous converter having six alternating-current terminals and having direct-current terminals, two groups of Y-connected transformer windings, said alternating-current terminals being connected to the terminals of said Y-connected transformer windings, means for connecting one set of transformer windings to a three-phase source of alternating current, an interphase transformer having a winding connected between the neutral points of said groups, a neutral connection to an intermediate tap on the winding of said interphase transformer, and a load connected between said connection and one of said direct-current terminals, whereby the direct-current load is responsive to the alternating-current reactance of said interphase transformer.

5. The method of controlling the direct current to a load of a synchronous converter having six alternating-current terminals, having direct current terminals and fed from a supply circuit providing three-phase alternating currents, which comprises applying half of said energy of the three-phase currents to three of said alternating-current terminals, converting the other half of said energy into three additional phases, each of said phases being equi-angularly spaced between the phases of first said three-phase currents, applying the converted phases to the other three alternating-current terminls, providing a neutral connection for each of the two groups of three-phases, connecting said neutral connections together through an inductive reactor means, and applying a load between a center tap of said reactor means and one direct-current terminal of said converter.

MONTFORD MORRISON.

REFERENCES CITED

The following references are of record in the file of this patent:

UNITED STATES PATENTS

| Number | Name | Date |
|---|---|---|
| 607,621 | Lamme | July 19, 1898 |
| 660,320 | Young | Oct. 23, 1900 |
| 695,944 | Peck | Mar. 25, 1902 |
| 697,035 | Steinmetz | Apr. 8, 1902 |